United States Patent [19]

Stewart et al.

[11] Patent Number: 4,893,066
[45] Date of Patent: Jan. 9, 1990

[54] HYBRID SAMPLE RATE SERVO MOTOR CONTROLLER

[75] Inventors: Lowell J. Stewart, Poway; Alfred H. Mebane IV, San Diego, both of Calif.

[73] Assignee: Hewlett-Packard Company, Palo Alto, Calif.

[21] Appl. No.: 246,240

[22] Filed: Sep. 19, 1988

[51] Int. Cl.⁴ .............................................. G05B 19/29
[52] U.S. Cl. ..................................... 318/600; 318/632; 318/636; 318/594; 318/569
[58] Field of Search ............... 318/600, 632, 636, 594, 318/569

[56] References Cited

U.S. PATENT DOCUMENTS 4,529,325 7/1985 Moon ................................ 318/594 X
4,642,542 2/1987 McKeant ............................. 318/636

OTHER PUBLICATIONS

Linear Control System Analysis and Design (Conventional and Modern), McGraw Hill, Inc., 1975, John J. D'Azzo, Constantine H. Houpis.

Primary Examiner—William M. Shoop, Jr.
Assistant Examiner—Saul M. Bergmann

[57] ABSTRACT

A hybrid sample rate servo motor employing rate feedback compensation is disclosed. The system employs a shaft encoder having a predetermined resolution to provide position data which are pulses indicating the shaft has moved another resolution unit. Under high motor velocity conditions the rate compensation feedback loop is operated at a conventional constant sample rate. Under low velocity conditions, the sample rate at which the rate compensation feedback loop is operated is modified so that rate samples are taken and calculated only when new position data are available from the motor encoder. Rate quantization error is substantially reduced, thereby leading to more robust controller operation.

18 Claims, 7 Drawing Sheets

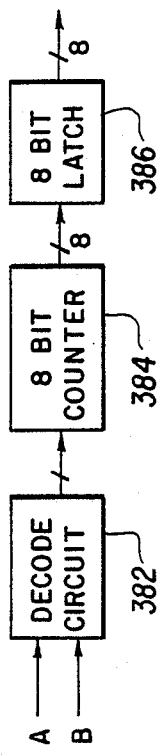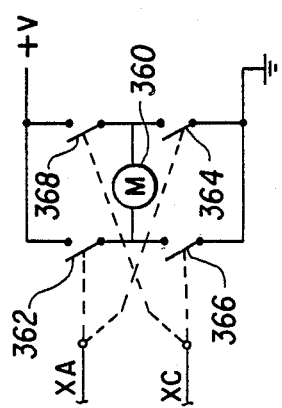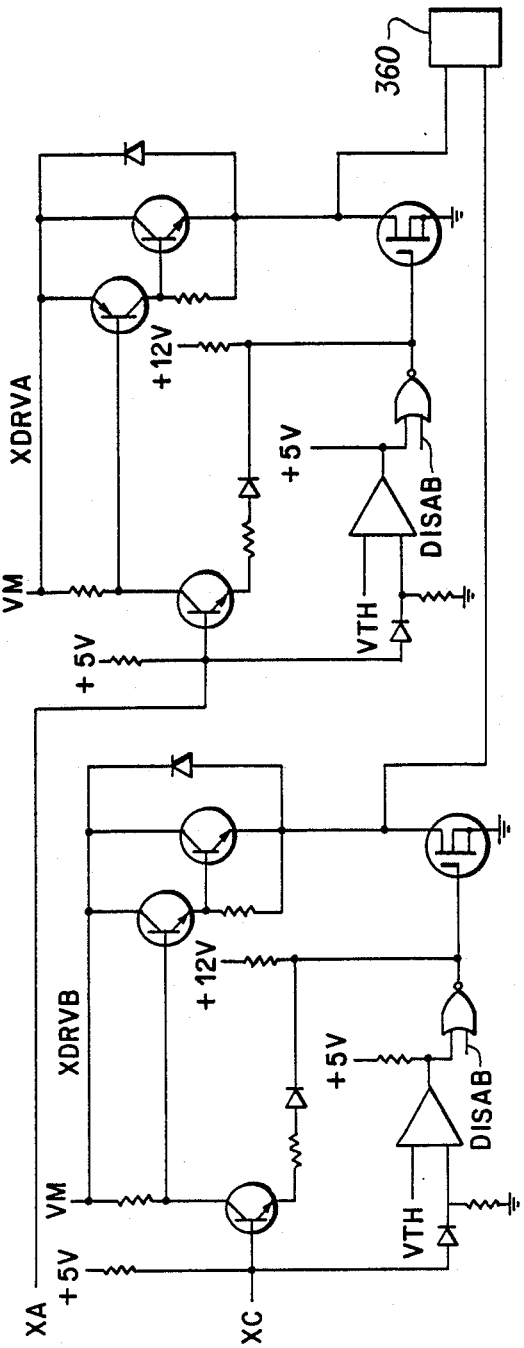

HYBRID SAMPLE RATE SERVO MOTOR CONTROLLER

BACKGROUND OF THE INVENTION

The present invention relates to controllers employing rate feedback loops, and more particularly to digital servo controllers employing a means for substantially reducing velocity quantization errors under low rate or velocity conditions, thereby reducing noise, allowing a more robust operation, and eliminating the need for a dynamically reconfigured servo controller.

It is well known in the art to employ rate feedback loops or compensation in controllers as a means for improved controller performance. An exemplary description of rate feedback compensation appears in "Linear Control System Analysis and Design," John J. D'Azzo and Constantine H. Houpis, 1975, McGraw-Hill, Inc., at 10-14 et seq. FIG. 1 shows an exemplary block diagram of a conventional controller for the controlled plant 25, which may typically comprise a servo motor. Here, a reference signal is provided to summing element 20 which combines the reference signal with the inverted contributions from the position feedback loop 30 and the rate feedback loop 35. The position feedback loop 30 provides a contribution dependent on the position of the controlled plant 25, as amplified by the loop position constant $K_1$. The rate feedback loop 35, analyzed in terms of the Laplace transform S plane, converts the position data from the plant 25 into rate or velocity data by multiplication by S, and then amplifies the rate data by the loop rate constant $K_2$. The resultant combined signal is then provided to the controlled plant 25 as the drive signal. The use of rate compensation offers significantly improved performance over controllers employing only position feedback compensation.

It is also known to digitize the conventional rate compensation controller of FIG. 1. Typically, in the application of a servo motor controller, the position and rate data are provided by a motor shaft encoder. The encoder provides a pulse each time the shaft rotates through a predetermined angular excursion. For example, optical encoders use a disc having a plurality of radially aligned slots disposed around the periphery of the disc. A light source is trained on the periphery of the disc on one side thereof with a light detector disposed on the other side thereof. As the disc rotates with the shaft, a series of pulses will be generated by the detector as the encoder disc interrupts the light beam. Thus, the encoder has a predetermined angular resolution dependent on the spacing of the slots on the disc periphery. This angular resolution translates into some translational resolution, in dependence on the particular mechanism driven by the motor. For a digitized controller, each loop is conventionally operated at a particular sample rate, i.e., the contribution from each loop is updated based on fresh estimates of the position and rate once each sample period.

One typical application of a servo controller with rate compensation is for X-Y plotters, using an X-Y positioning apparatus to position a plotter pen and the plotter paper. These devices employ two servo motors, one for each axis, and the controller for each motor may employ rate compensation. Under high velocity, i.e., high rate, conditions for a particular motor or axis, the conventional controller performs satisfactorily. The encoder resolution is not a severe problem, since the angular excursion of the motor shaft between samples will be many times the minimum resolution of the encoder, so that the possible measurement error is a relatively small percentage of the total excursion. Under low velocity conditions, however, the quantization error resulting from the encoder operation is a serious problem, since the same sample rate is conventionally employed for the low velocity as well as the high velocity conditions. Thus, the motor shaft may have moved only very slightly between samples, so that the position and rate estimates or calculations are inaccurate as a result of the quantization error when the encoder provides a new pulse or incremented output. Such errors result in audible noise or jitter of the plotter apparatus under stationary conditions, reducing the robustness of operation, and may require a dynamically reconfigured servo or a higher resolution encoder to provide satisfactory performance, at substantially increased expense.

Others are believed to have sought to improve the performance of rate compensation controllers by varying equally the sample rates of both the position and rate feedback loop at low velocities, or by operating the two loops at fixed, but different sample rates, e.g., operating the position loop at a 1 Khz sample rate and the velocity loop at 5 Khz. These approaches are not believed to provide a satisfactory solution to the problem, however.

It is therefore an object of the present invention to provide a servo controller employing rate compensation but which substantially eliminates rate quantization error under low velocity conditions while not requiring expensive high resolution encoders or complex dynamically reconfigurable controllers.

SUMMARY OF THE INVENTION

A digital rate compensation servo controller is disclosed which substantially eliminates the quantization error under low velocity or rate conditions. The controller comprises a motor position indicator having a predetermined resolution and providing position data samples which are integral multiples of the encoder resolution. Under high velocity conditions, the rate feedback loop is operated with velocity or rate estimation based on a fixed sample rate, wherein the velocity is determined in the conventional manner by dividing the estimated distance travelled by the sample rate. Under low velocity conditions, in accordance with the invention, the rate feedback loop is operated with variable sample rate velocity estimation. Nonzero velocity estimates are calculated only when incremented position data samples are received from the position indicator. The rate compensation is set to zero for other calculations occurring between the incremented position samples in the low velocity condition.

BRIEF DESCRIPTION OF THE DRAWINGS

These and other features and advantages of the present invention will become more apparent from the following detailed description of exemplary embodiments thereof, as illustrated in the accompanying drawings, in which:

FIG. 6A is a simplified schematic diagram of an exemplary motor drive circuit, and FIG. 6B is a more detailed schematic diagram of a motor drive circuit as used in the embodiment of FIG. 3.

FIG. 7 is a simplified block diagram showing elements of the decode logic for generating an encoder count from the shaft optical encoder.

DETAILED DESCRIPTION OF THE DISCLOSURE

Figure 2:
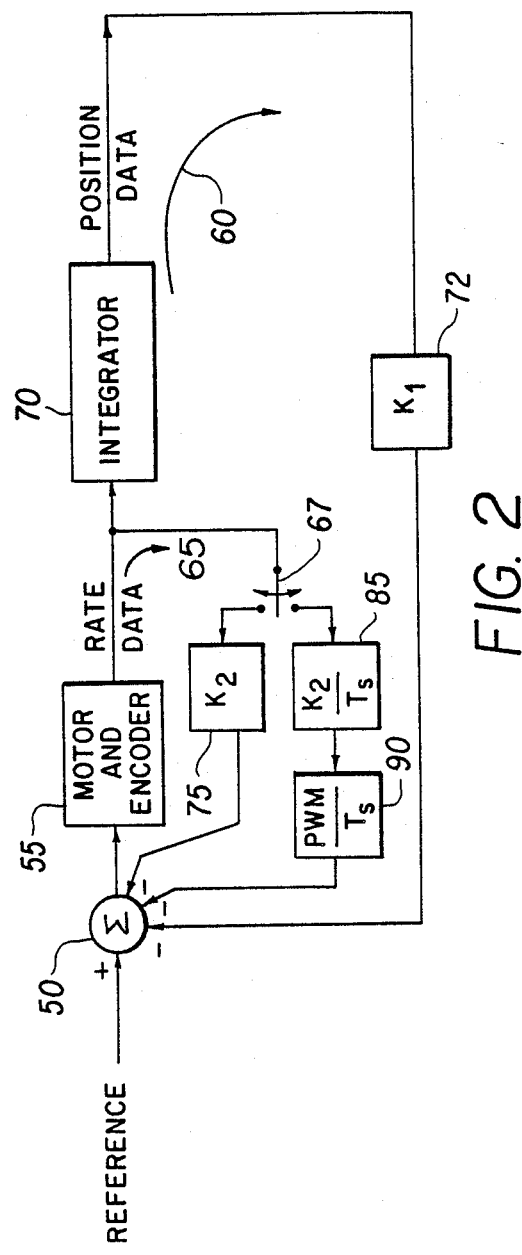
FIG. 2 is a simplified block diagram of a rate compensation servo controller employing the invention.

An exemplary embodiment of a digital servo motor controller employing the present invention is shown in FIG. 2. Under high velocity conditions, the rate compensation loop is operated at the same position indicator sample rate as the position compensation loop. Under low velocity conditions, however, the rate compensation loop is operated at a special variable sample rate.

Figure 1:
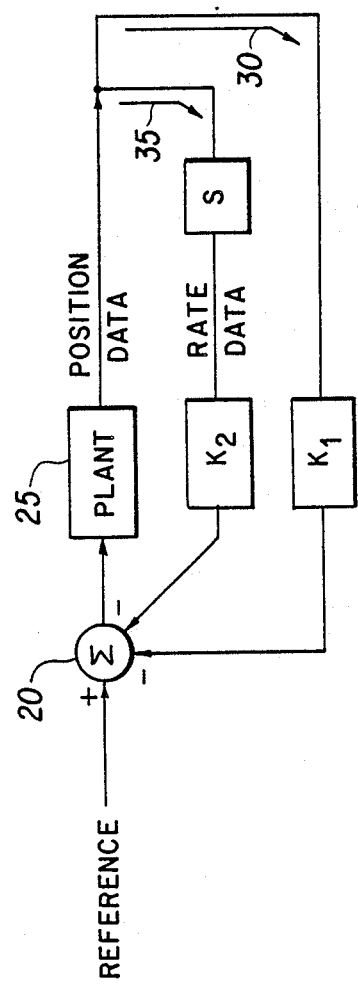
FIG. 1 is a simplified block diagram of a known servo controller employing rate compensation.

In FIG. 2 the combiner 50 combines the reference motor drive signal with inverted versions of the position and rate feedback loop contributions to provide a composite motor drive signal to motor 55 as in the conventional controller of FIG. 1. In this embodiment the encoder output of the motor and encoder 55 is data representative of the rate of movement along the single axis, i.e., representative of the rate because of a constant sample rate at which the encoder output is sampled, e.g., one sample every 600 microseconds. Thus, the rate is determined by dividing the incremental displacement of the shaft during the sample period by the duration of the sample period.

The rate data is fed into the rate compensation loop 65. The operation of loop 65 depends on whether the motor is being driven at high or low speeds. Thus, under high speed conditions, the rate loop operates in the conventional manner, with a fixed sample rate for estimating velocity. The rate is proportional to the number of encoder pulses generated during the sample period divided by the duration of the sample period. Thus, under high speed conditions, the rate data fed back to combiner 50 is the encoder output of the motor and encoder 55 multiplied by the system rate constant $K_2$ (illustrated by block 75). Under low speed conditions, the loop 65 is operated at a variable sample rate determined by the encoder output.

The two types of operations of loop 65 are illustrated schematically in FIG. 2. By switch 67, element 75 is selected for normal high speed operation, and elements 85 and 90 are selected for low speed operation. This schematic diagram is for illustrative purposes only, inasmuch as both rate compensation operations are preferably carried out in a preferred embodiment by an appropriately programmed microprocessor. The rate constant $K_2$ is chosen in dependence on the application, in the conventional manner, with element 75 amplifying the rate data from motor and encoder 55 by the rate constant $K_2$. Thus, during high rate or velocity conditions, the microprocessor periodically multiplies the current rate or velocity estimates by the rate feedback constant to obtain the rate feedback loop contribution. This is the conventional rate compensation operation.

Under low speed operation, however, the rate compensation loop 65 operates with elements 85 and 90 instead of element 75. In this case, then, the switch 67 is "thrown" to select the loop branch with elements 85 and 90. In the preferred embodiment, the "switch" is simply a decision implemented by the code resident in the controller microprocessor. Element 85 includes the rate constant $K_2$ but also divides this constant by the sample period $T_s$. In accordance with the invention, the loop operation is performed only when the encoder provides new rate or position information, i.e., whenever a new pulse or count is received from the encoder. In effect, during the low velocity operation, the displacement of the rotor shaft during each variable sample period will be constant, i.e., equal to the resolution of the encoder, with the sample period $T_s$ varying; during high velocity operation, the sample period $T_s$ is held constant (e.g., at 600 microseconds), with the displacement varying in dependence on the velocity.

As will be described below, the preferred embodiment of the controller comprises a microprocessor or other computing apparatus to compute the elapsed time between successive updated position or velocity samples in the low velocity condition, and then to perform the operations indicated by element 85.

The rate compensation loop 65 for the low velocity case also may include a second operation 90, which further reduces the rate feedback signal by an equivalent factor equal to $1/T_s$, the measured variable sample period.

Referring again to FIG. 2, the position feedback loop 60 includes an integration operation, shown as element 70, which integrates the rate data from the motor and encoder 55 to provide resultant position data, which is amplified by the constant $K_1$ as indicated by operation 72. This loop is operated at the same rate in both the high and low velocity condition.

That the motor and encoder apparatus are shown as providing rate information instead of position information is merely illustrative of the implementation employed in the preferred embodiment. The encoder may alternatively be considered to provide position data, which may then be differentiated to provide the rate data for the rate compensation loop.

Under high velocity or rate conditions, then, the controller utilizes rate or velocity calculated in accordance with Eq. 1:

$$V = (\Delta x)/T, \quad (1)$$

where
 $V$ = the velocity or rate;
 $\Delta x$ = the change in position during the sample period; and
 $T$ = the (fixed) sample period.

Under low velocity conditions, the velocity is calculated in accordance with Eq. 2:

$$U = X/T_s, \quad (2)$$

where
 $X$ = the encoder resolution; and
 $T_s$ = the (variable) sample period duration.

Block 85 of FIG. 2 indicates the implementation of the calculation of Eq. 2. Calculating the velocity under low velocity conditions using Eq. 2 reduces the quantization error, but does not eliminate it. The technique results in an average rate estimate value indicating the average rate or velocity over the entire (variable) sample period, and hence does not provide an accurate measure of the instantaneous velocity at any given instant of time. Hence there is still some quantization error even with this modification to the way the velocity is calculated, and the lower the velocity, the higher the quantization error component of the velocity. This quantization error may appear as a significant noise signal in the velocity component of the control signal to the motor pulse width modulator, and may cause both audible noise and instability in the servo. For many applications, the remaining noise may be unacceptable. In order to further reduce this noise signal, the velocity estimate is further reduced under low velocity conditions in this embodiment by again dividing it by the time between successive incremental encoder counts, as indicated by operation 90 in FIG. 2. This has the effect of reducing the velocity constant $K_2$ under low velocity conditions. What this accomplishes is further reduction of the noise source (quantization error) under the worst case conditions (low velocity). The slower the velocity, the more quantization error will remain in the signal and the more it will be attenuated by reducing the velocity constant $K_2$.

In the preferred embodiment, the method used to accomplish the second division by the $T_s$ time between successive encoder count increments is to control the time the signal persists, rather than the amplitude of the signal. For example, if $T_s=2$ units of time, the velocity component feedback signal would be turned off at the end of the first unit of time, so that the velocity component feedback signal would be zero for the last time unit of the sample time t=2 units. Thus, the average value of the feedback signal would be ½ of its level during the first time unit. This method does not require another explicit division operation, which would require substantial processor time and is to be avoided if possible. The net result is the same whether the amplitude of the velocity component of error or the duration of this component is reduced.

It is contemplated that functions for further reducing the quantization noise other than $1/T_s$ may also be employed. The function of the second operation in a general sense is to attenuate the velocity component of the feedback signal more for lower velocity conditions.

As a result of the invention, it will be appreciated that the encoder quantization noise is substantially reduced under low velocity conditions.

Figure 3:
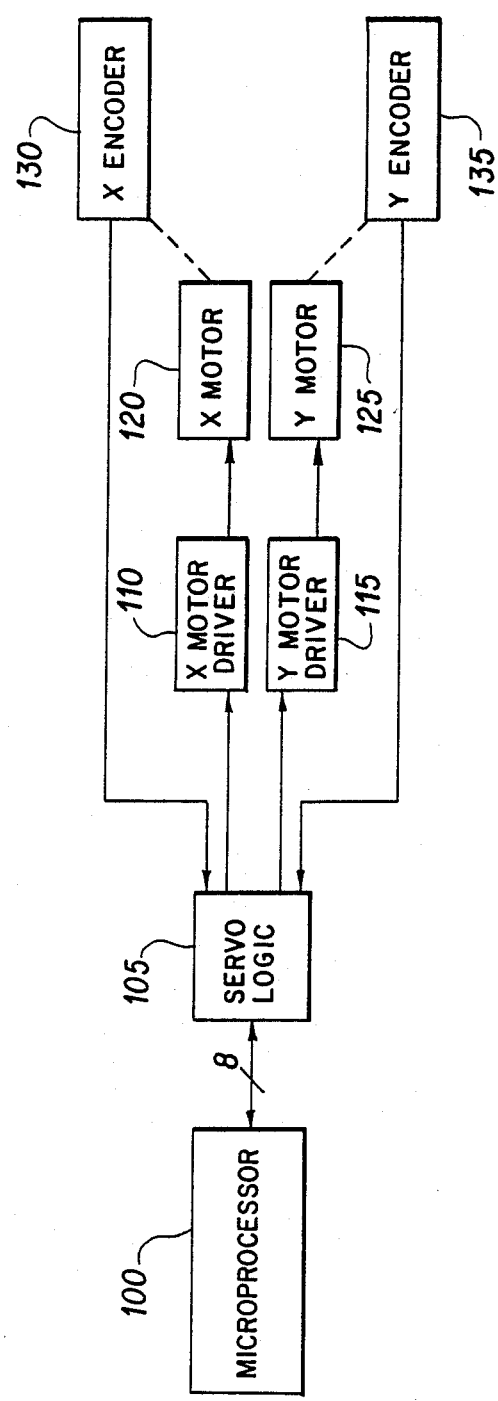
FIG. 3 a simplified block diagram of a two axis rate compensation servo controller employing the invention.

FIG. 3 illustrates the preferred implementation of a two-axis servo motor controller system embodying the invention. This embodiment may advantageously be employed in an X-Y plotter, for example, wherein the X axis motor drives the plotter pen along the X axis, and the Y axis motor drives a paper transport for propelling the plotter paper along the Y axis. Exemplary commercially available plotters to which the present invention may be adapted are the model 7575 and 7576 plotters marketed by Hewlett-Packard, Palo Alto, Calif., the assignee of the present invention. The system is under control of a microprocessor 100, which is coupled to servo logic circuit 105 by an 8-bit bus 107. The servo logic 105 is coupled to the X and Y motor drivers 110 and 115, which in turn are coupled to the respective X and Y motors 120 and 125. The motors 120 and 125 are d.c. motors driven by a.c. signals from the pulse width modulators comprising the servo logic circuitry 105. The pulse width modulators are responsive to digital control words received from the microprocessor 100 which independently control the operation of each motor. The angular positions of the motor shafts are monitored by respective optical shaft encoders 130, 135. The optical encoders used for this application comprise 500 line encoder devices. The outputs of the encoders are fed back to the servo logic circuitry 105. The motor drivers 110, 115, the motors 120, 125 and the shaft encoders 130 and 135 are well known in the art.

Figure 4:
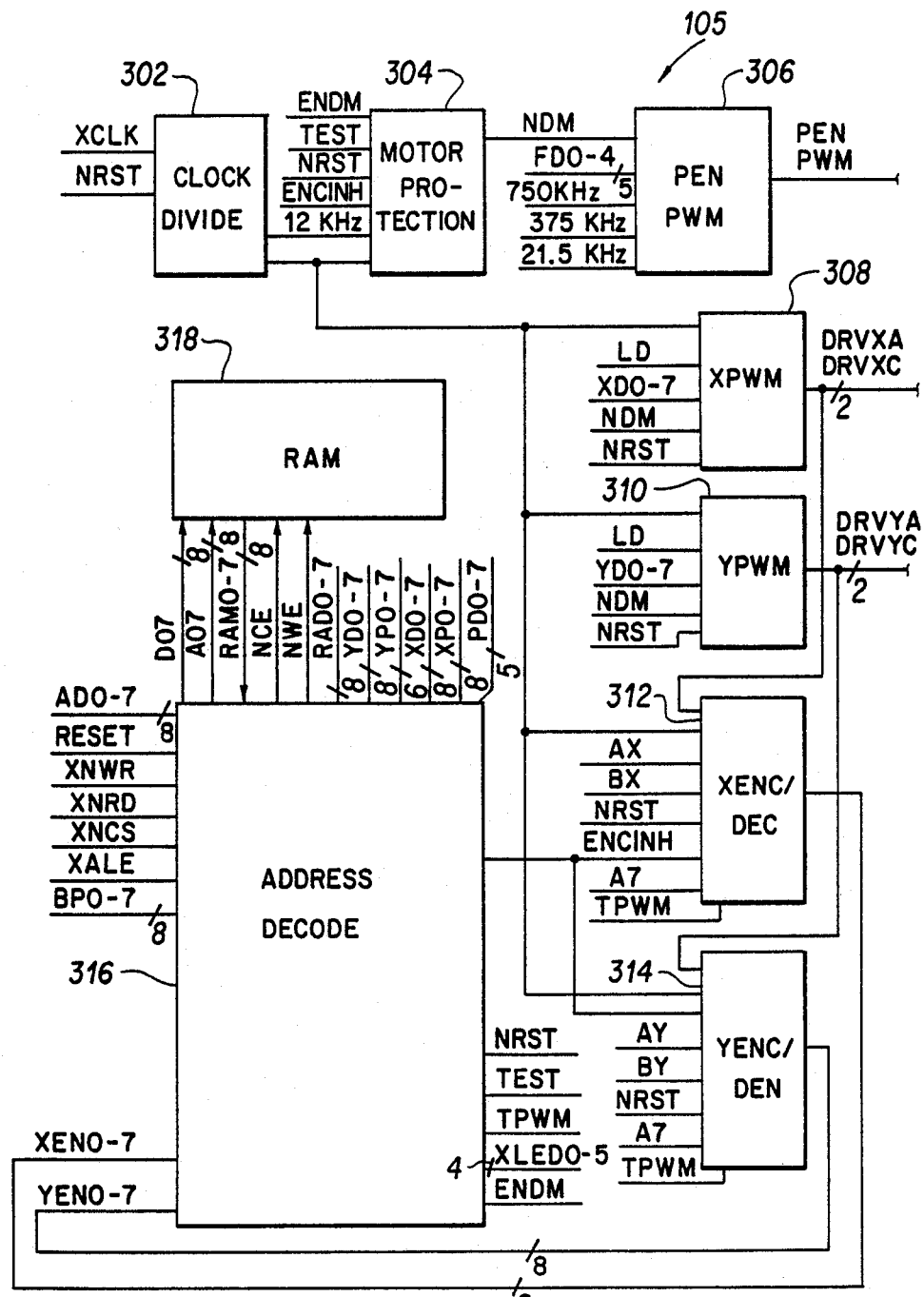
FIG. 4 is a simplified schematic drawing of the servo logic circuit comprising the embodiment of FIG. 3.

A simplified block diagram of the servo logic 105 is shown in FIG. 4. The logic 105 comprises a clock divider circuit 302 for dividing a master clock frequency (e.g., produced by a clock source, such as a crystal oscillator not shown) into the several clock frequencies required for operation of the servo logic 105. A motor protection circuit 304 detects error states in the motor signals, evidencing hardware failures and the like, and turns off the motor drive signals if errors are detected. A pen pulse width modulator 306 provides the Z axis drive signals for driving the plotter pen solenoid in the Z direction. Since the pen drive circuitry form no part of the present invention, it is not described further herein.

The servo logic 105 further comprises the X-axis and Y-axis pulse width modulators (PWMs) 308 and 310 for providing the respective drive signals to the X and Y axis motors. Separate decoder circuits 312, 314 are provided to convert the inputs from the respective X-axis and Y-axis optical encoders 130 and 135 into corresponding encoder count values. The logic 105 further includes address decode random logic 316 which generates the address signals used during operation of the servo logic 105 and random access memory 318.

Figure 5:
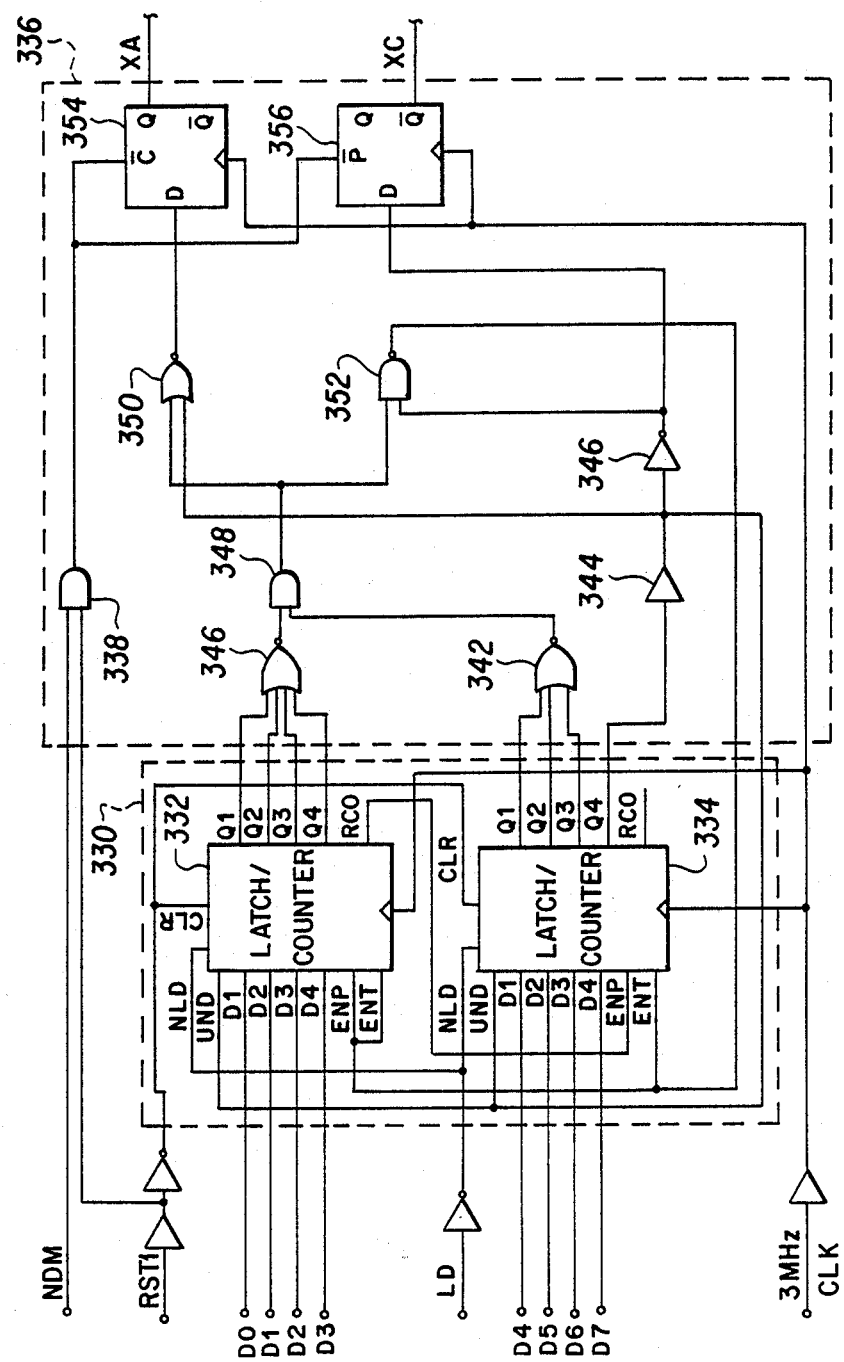
FIG. 5 is a simplified schematic block diagram of an exemplary pulse width modulator comprising the servo logic of FIG. 4.

A block diagram of the X-axis pulse width modulator 308 is shown in FIG. 5 and exemplifies both the X-axis and Y-axis pulse width modulators 308 and 310. Pulse width modulators per se are well known in the art. The circuit 308 comprises an 8-bit duty cycle latch/counter 330 whose state determines the motor "on" time for a given PWM period. In this embodiment, the 8-bit latch/counter 330 comprises a pair of 4-bit counters 332 and 334 cascaded together as shown in FIG. 5. The period of the PWM in this embodiment is constant (e.g., 43 microseconds), and is controlled by a one-shot device (not shown) in the clock circuitry run off a 23.5 Khz clock. Once every rising edge of the input from the one-shot device, a signal pulse LD is sent to the load input of the 8-bit counter 330. The pulse signal LD signals the beginning of another period of the operation of the latch/counter 330.

A programmable duty cycle for the PWM 308 is provided by the synchronously loading up/down latch/counter 330. The latch/counter is written to/from the data bus D0-D7 in the Address Decode circuitry 316 of the servo logic 105. The loading of the latch/counter 308 is controlled by the signal LD. The contents of the latched input to the latch/counter 330 are interpreted as a two's complement integer. The most significant bit of the input D0-D7 controls the counter direction. For negative numbers, the latch/counter 330 counts up to zero. For positive numbers, the latch/counter 330 counts down to zero. When the counter reaches zero, further counting is disabled.

The outputs Q1-Q4 of the respective 4-bit counters 332 and 334 are processed further by logic circuitry 336 to provide the PWM outputs XA and XC. The circuitry 336 comprises AND gates 338 and 348, NOR gates 340, 342, 350 and 352, amplifier 344 and inverter 346, and flip-flops 354 and 356. The XA and XC signals are active high outputs generated from the respective counter outputs Q1–Q4. For positive counter values, XA is enabled and XC is disabled. The reverse is true for negative counter values. When the counter state is zero, both outputs are disabled. The signal LD will start another cycle by loading in the input number to the latch/counter 330, thus establishing the "on" time of the PWM. The input number will determine the "on" time of either the signal XA or XC, depending on the sign bit. The signal NRST clears the duty cycle counter 330 and disables the PWM outputs.

The signals XA and XC control the motor drive circuit for the dc X-axis motor. A simplified schematic of the drive circuitry is shown in FIG. 6A, wherein the windings 1 and 2 motor 360 is alternatively opened (when both XA and XC are inactive), connected between the drive source voltage V and ground when the signal XA is active, and connected with the opposite polarity when the signal XC is active. Thus, switches 362, 364 are controlled by the signal XA and the switches 366, 368 are controlled by the signal XC. In this manner, the motor may be turned off (both XA and XC inactive), driven in a first direction (XA active, XC inactive) and driven in the opposite direction (XA inactive, XC active).

An exemplary X-axis motor drive circuit embodying the simplified schematic of FIG. 6A is shown in FIG. 6B. The operation of the circuit will be apparent to those skilled in the art without further description.

The servo logic 105 comprises the two decoders 312 and 314 as described above. To further illustrate these circuits, a simplified block diagram of the decoder 312 is shown in FIG. 7. (The decoder 314 is similar to circuit 312.) The circuit 312 comprises a decode circuit 382, an 8-bit position counter 384 and an 8-bit latch 386.

The purpose of the decoder 312 is to convert the input signals from the optical encoder 130 into an encoder count state. The optical encoder output in this embodiment is in the form of two TTL level signals A and B in quadrature. A transition on either input line to the decode circuit 382 causes the counter to increment or decrement. The phase of the A input with respect to the B input determines whether the count is incremented or decremented. If the A input lags the B input, a transition on either line causes the counter to increment. If the A input leads the B input, a transition decrements the counter 384. The decoder circuit 382 develops the counter input signals from the A and B input signals. All eight bits of the position counter 384 are input to an 8-bit latch. An encode inhibit signal prevents data from being latched, so that the data in the latch does not change while being read by the microprocessor 100.

The microprocessor 100 provides the digital control words to the servo logic 105 necessary to cause the motors to rotate in the desired direction and to the desired position. The microprocessor 100 also periodically reads the state of each decoder 8-bit position counter latch 386 comprising the servo 105 on an interrupt basis, typically every 600 microseconds. The count states of the position counters represent position data reflecting the angular position of the motor shafts and, therefore, the respective positions along the X and Y axis. The microprocessor 100, upon reading the count state after each period, differentiates the position data to provide velocity or rate data. The differentiation effectively is performed by subtracting the current count from the previously read count. This rate data corresponds to the rate data provided at the output of the motor and encoder 55 of FIG. 2. The rate data is then integrated, i.e., added to the previous position data to provide the current position data at the output of the integrator 70 of FIG. 2. The differentiation and integration operations are performed by the microprocessor 100.

Figure 8:
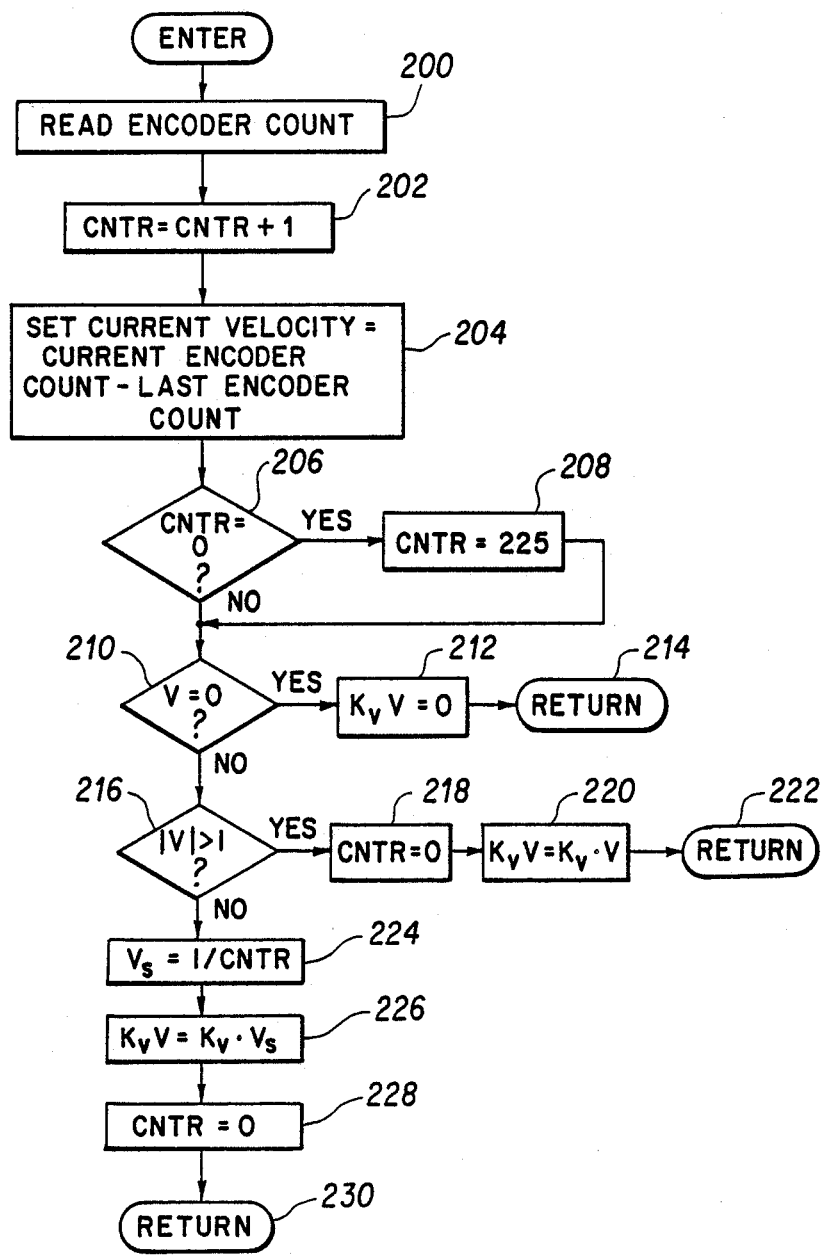
FIG. 8 is a simplified flow diagram illustrative of the operation of the servo controller of FIG. 3.

Referring now to FIG. 8, a simplified flow diagram illustrative of the operation of the microprocessor 100 for implementing the rate compensation is set forth. The rate compensation is included in an interrupt-driven subroutine performed periodically on an interrupt from the normal microprocessor operation. In the disclosed embodiment, the interrupt rate is at a rate of one interrupt every 600 microseconds. Thus, the velocity is calculated every 600 microseconds under high velocity conditions.

The subroutine is entered, and at step 200, the current decoder position counter count, i.e., the "encoder count," is read and stored. At step 202, the variable CNTR is incremented by 1. This variable is the state of an eight-bit software counter which is used to keep track of the number of interrupt cycles which have elapsed since the last encoder count change, and provides a measure of the time $T_s$. At step 204, the current velocity variable V is calculated as the difference between the current encoder count and the last encoder count read during the previous interrupt. Inherent in the velocity calculation is the constant interrupt period (here 600 microseconds).

At step 206, the state of the variable CNTR is checked. If CNTR is zero, this indicates that the counter has passed through the count 256 and reset itself. To correct for the reset condition, the counter state is set to 255 at step 208 if the decision at step 206 was affirmative.

At step 210, the current velocity variable V is checked and if zero, then at step 212 the product of the constant $K_v$ (equal to the product of the constants $K_1$ and $K_2$ of FIG. 2) and the velocity V is set to zero and the subroutine ends. Steps 210, 212 and 214 operate so that the rate compensation provided by the rate feedback loop is zero for each low velocity rate compensation calculation, except those calculations immediately following the interrupt cycle in which an incremented encoder count is detected, resulting in a velocity calculation employing the relationship of Eq. 1. The rate compensation following from each interrupt cycle following the cycle in which the encoder count was incremented is again set to zero, until a fresh encoder increment is detected. This has the effect of averaging the non-zero rate compensation contribution over the preceding variable sample period, ending with detection of a newly incremented encoder count. This averaging is in effect a form of pulse width modulation and a divide-by-$T_s$ operation, implementing element 90 of the block diagram of FIG. 2.

If the variable V is not zero at step 210, then its magnitude is checked at step 216. If the magnitude is greater than 1, this indicates that the motor has moved so rapidly during the preceding interrupt period that the encoder has advanced more than one count. In this embodiment, this is taken as the indication of the existence of the high velocity condition, and as a result, the variable CNTR is set to zero (step 218) and the conventional calculation is performed to determine the velocity and obtain the product of the velocity constant and the velocity (step 220). The subroutine then returns (step 222). Decision 216 therefore implements the operation of switch 67 of FIG. 2.

If the magnitude of the velocity variable V is not greater than 1 (step 216), this is taken as the indication of the existence of the low velocity condition. At step 224, the slow condition velocity variable $V_s$ is set equal to the inverse of the counter state (1/CNTR). This calculation implies that the slow condition velocity is proportional to the inverse of the number of interrupt periods since the encoder count last changed. At step 226, the product of the position and velocity constants and the velocity is set equal to the product of $K_v$ and the slow velocity variable $V_s$. At step 228, the counter state CNTR is set equal to zero and program operation returns. The rate feedback compensation value calculated at step 226 will persist for only one interrupt period, since if there is no change in the encoder count the next time it is read during the next interrupt cycle, the rate compensation value will be set to zero (step 212). This implements the second $1/T_s$ operation (block 90, FIG. 2) without requiring an explicit microprocessor divide operation, as discussed above.

The magnitude of the constant $K_v$ is determined by the particular application parameters, and incorporates the encoder resolution value. Alternatively, the calculation of the velocity under low velocity conditions (step 224) could be modified to (encoder resolution value/CNTR) if the velocity constant does not incorporate the encoder resolution value.

A listing of an exemplary program for the implementing the flow chart of FIG. 8 is set forth in Appendix A. The listing is in assembly language for the 805X family of microprocessors marketed by Intel Corporation.

Figure 9:
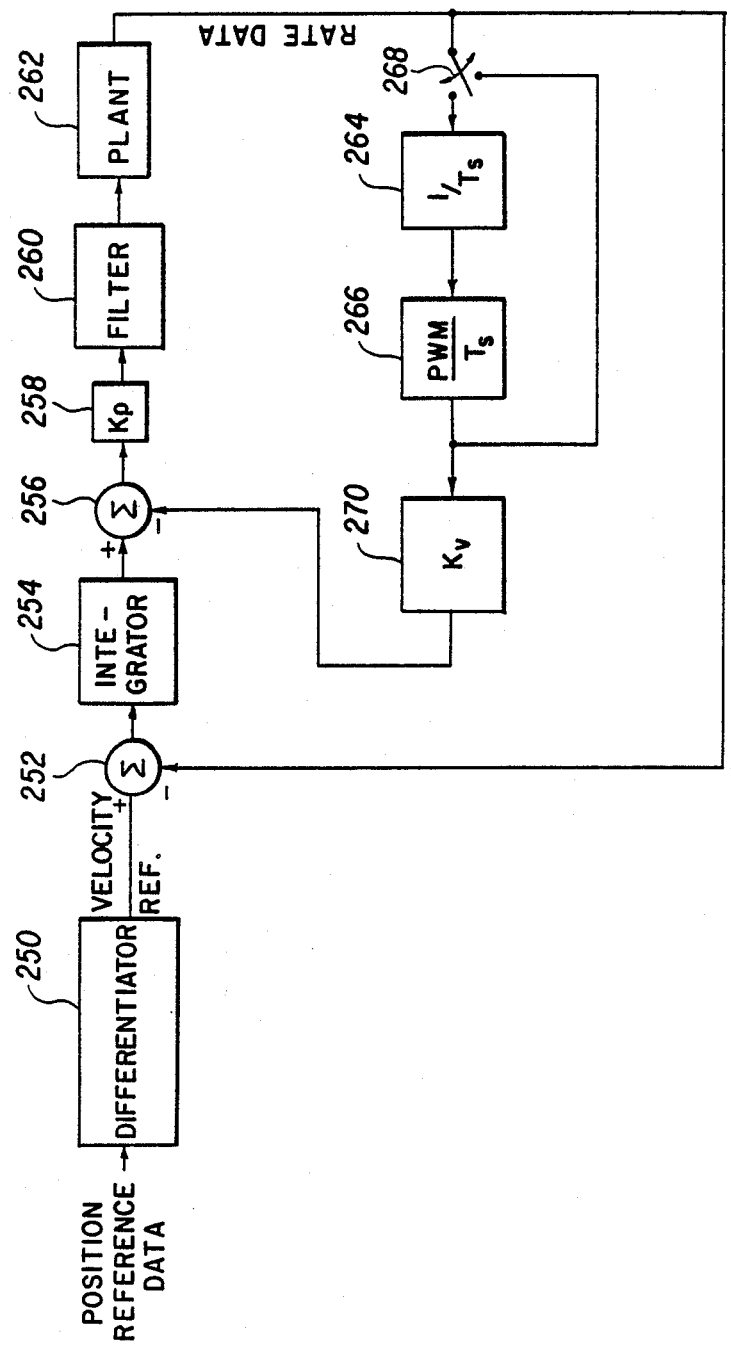
FIG. 9 is a simplified block diagram generally equivalent to the block diagram of FIG. 2.

The code listing of Appendix A implements the functions shown in the block diagram of FIG. 9, which can be shown to be the general equivalent of the block diagram of FIG. 1. (In describing the figure, "lines xxx" refer to code line numbers of Appendix A.) As illustrated in FIG. 9, position reference signals are provided which indicates the desired position destination of the controlled plant apparatus 262. This reference data is differentiated (block 250) to provide velocity reference signals. The velocity reference signals are summed (block 252) with the inverse of the conventional rate or velocity estimate data from the plants 262 (lines 20-31 and 54-58). The resultant signal is integrated (block 252) to provide position error data. This data is summed (block 256) with the inverse of the rate compensation signal (lines 132-134). The resultant signal is multiplied by the constant $K_1$ (block 258, lines 139-1556) and low pass filtered (block 260, lines 162-282) to provide a signal which is processed (lines 284-310) to provide the plant drive and control signals. The plant 262 includes a displacement indicator such as the optical shaft encoder to provide data representative of the conventional velocity or rate estimate. The switch 268 (line 64) is analogous to switch 67 (FIG. 2). In the high velocity condition, the switch is closed to bypass blocks 264, 266; in the low velocity condition, the switch is open. Lines 66-96 implement the functions indicated by blocks 264, 266 and 270 under low velocity conditions. Lines 103-125 implement the functions indicated by block 270 under high velocity conditions.

It is understood that the above-described embodiments are merely illustrative of the possible specific embodiments which may represent principles of the present invention. Other arrangements may readily be devised in accordance with these principles by those skilled in the art without departing from the scope of the invention.

APPENDIX A

```
1
2      ****************************************************************
3      *                                                              *
4      *       THIS IS THE START OF INTERRUPT CODE                    *
5      *                                                              *
6      ****************************************************************
7
8
9   IRQ         EQU         $
10              MOV         S_TEMP_ACC,A
11              MOV         S_TEMP_PSW,PSW
12              CLR         TF2                 ;SO CAN INTERRUPT AGAIN
13              MOV         S_TEMP_B,B
14              MOV         S_TEMP_DPL,DPL
15              MOV         S_TEMP_DPH,DPH
16
17  *
18  ** FIRST, GET REF FROM BUFFER AND ADD INTO X AND Y ERRORS
19  *
20              MOV         R0,S_REF_PNTR
21              MOV         A,@R0
22              MOV         B,#0                ;SIGN EXTEND
23              JNB         ACC.7,ADD_X
24              DEC         B
25
26  ADD_X       EQU         $
27              ADD         A,S_XERRORL
28              MOV         S_XERRORL,A
29              MOV         A,S_XERRORH
```

```
30                ADDC        A,B
31                MOV         S_XERRORH,A
32
33  XSERVO        EQU         $
34                MOV         R0,#S_XENCODER    ;READ ENCODER
35                MOVX        A,@R0
36
37                XCH         A,S_OLDXPOS       ;LOAD OLD, SAVE NEW
38                SUB         A,S_OLDXPOS       ;COMPUTE -VEL
39
40                MOV         B,A               ;SAVE A MOMENT
41                MOV         C,ACC.7
42                MOV         S_VEL_DIR,C
43
44                MOV         R1,#0             ;SIGN EXTEND BYTE
45                JNC         XSERVO3
46                DEC         R1
47                CPL         A
48                INC         A
49
50  XSERVO3       EQU         $
51                XCH         A,B               ;SAVE ABS(VEL) IN B
52                                              ;LOAD -VEL INTO ACC
53
54                ADD         A,S_XERRORL
55                MOV         S_XERRORL,A       ;XERROR := XERROR+(-VEL)
56                MOV         A,S_XERRORH
57                ADDC        A,R1
58                MOV         S_XERRORH,A
59
60  *
61  ** IF X AXIS IS SLOW, THEN COMPUTE ACCURATE VELOCITY
62  ** AT THIS POINT, B HAS ABS(VEL), R1 HAS SIGN EXTEND FOR ACTUAL VEL
63  *
64                JNB         S_X_IS_SLOW,XSERVO3_2
65
66                MOV         A,S_SLOWX_CNTR
67                INC         A                 ;INC SLOW_CNTR, BUT LIMIT
68                JNZ         XSERVOS1          ; TO 255
69                DEC         A
70  XSERVOS1      EQU         $
71                MOV         S_SLOWX_CNTR,A
72
73                XCH         A,B               ;LOAD ABS(VEL) INTO ACC,
                                                ;SAVE SLOW_CNTR IN B
74                JZ          XSERVO3_22        ;ANY CHANGE THIS INT?
75                CJNE        A,#1,XSERVO3_20
76
77                MOV         A,#0FFH
78                DIV         AB                ;DIVIDE SLOW_CNTR INTO 1
79                                              ;(APPROX)
80                MOV         B,S_KXVELOCITY
81                MUL         AB                ;NOW IN 4.12 FORM
82
83                MOV         A,B
84                SWAP        A
85                MOV         C,ACC.7
86                ANL         A,#0FH            ;NOW IN 8.0
87                ADDC        A,#0
88
89                MOV         B,#0              ;LOAD ZERO INTO HIGH BYTE
90                MOV         S_SLOWX_CNTR,#0   ;CLEAR COUNTER
91
92                SJMP        XSERVO3_21        ;CONTINUE NORMALLY NOW
93
94  XSERVO3_22    EQU         $
95                MOV         B,A               ;CLEAR HIGH BYTE
96                SJMP        XSERVO3_21
```

```
 97
 98  XSERVO3_20      EQU         $
 99                  MOV         S_SLOWX_CNTR,#0
100                  MOV         B,A
101
102  XSERVO3_2       EQU         $
103                  MOV         A,S_KXVELOCITY    ;VELOCITY FEEDBACK GAIN
104                  MUL         AB                ;B STILL HAS ABS(VEL)
105                  ANL         A,#0F0H
106                  MOV         R0,A
107                  MOV         A,B
108                  ANL         A,#0F0H
109                  SWAP        A
110                  XCH         A,B
111                  ANL         A,#0FH
112                  ORL         A,R0
113                  SWAP        A
114  *
115  ** NOW, B:ACC = KV*ABS(VEL) IN 16.0
116  *
117
118  XSERVO3_21      EQU         $
119                  JNB         S_VEL_DIR,XSERVO4
120                  CPL         A
121                  ADD         A,#1
122                  XCH         A,B
123                  CPL         A
124                  ADDC        A,#0
125                  XCH         A,B
126
127  *
128  ** NOW B:ACC = SIGNED KV*ABS(VEL) IN 16.0
129  *
130
131  XSERVO4         EQU         $
132                  ADD         A,S_XERRORL
133                  XCH         A,B
134                  ADDC        A,S_XERRORH
135
136  *
137  ** NOW, ACC:B = XERROR-KXV*VELOCITY
138  *
139                  MOV         F0,C
140
141                  MOV         R1,A              ;SAVE HIGH BYTE OF E-Kv*V
142
143                  MOV         A,S_KXGAIN
144                  MUL         AB
145                  MOV         A,B               ;FORGET LOWER EIGHT BITS
146                  XCH         A,R1              ;SAVE CY BYTE, LOAD HIGH
                                                   ;BYTE OF E-Kv*V
147                  MOV         B,S_KXGAIN
148                  MUL         AB
149                  ADD         A,R1              ;ADD IN CY BYTE
150                  XCH         A,B
151                  ADDC        A,#0
152
153                  JNB         F0,XSERVO6_1
154                  SUB         A,S_KXGAIN        ;GET SIGN RIGHT
155
156  XSERVO6_1       EQU         $
157                  XCH         A,B
158  *
159  ** NOW, B:A HAS 16 BIT (16.0 SIGNED) RESULT OF Kg*(Error-Kv*Vel)
160  *
161
162  X_FILTER_START  EQU         $
163
164                  JNB         S_FILTER_ON,XFILTER4
```

```
165
166                     MOV             R0,A                    ;SAVE LOW(E)
167                     MOV             R1,B                    ;SAVE HI(E)
168
169                     SUB             A,S_X_LASTE+1           ;GENERATE E-LASTE
170                     XCH             A,B
171                     SUBB            A,S_X_LASTE
172
173 ; NOW A:B = E - LASTE IN 16.0, R1:R0 = E IN 16.0
174
175                     XCH             A,R0
176                     XCH             A,S_X_LASTE+1
177                     XCH             A,B
178                     XCH             A,R1
179                     XCH             A,S_X_LASTE
180
181                     XCH             A,B
182
183 ;NOW HAVE B:A = LASTE, R0:R1 = E - LASTE, AND E HAS BEEN SAVED INTO LASTE
184
185                     RLC             A                       ;MULTIPLY BY 4
186                     XCH             A,B
187                     RLC             A
188                     XCH             A,B
189
190                     RLC             A
191                     ANL             A,#0FCH                 ;STRIP B.S. BITS
192                     XCH             A,B
193                     RLC             A
194
195 ; A:B NOW = LASTE*4/256 IN 8.8
196
197                     MOV             C,ACC.7
198                     MOV             F0,C                    ;FOR SIGN EXTENSION
199
200                     ADD             A,R1                    ;ADD TO LOW(E-LASTE)
201                     MOV             R1,A                    ;SAVE RESULT IN R1
202                     CLR             A
203                     JNB             F0,XFILTER9
204                     CPL             A
205 XFILTER9            EQU             $
206                     ADDC            A,R0
207
208 ; NOW HAVE E - LASTE + LASTE*4/256 IN A:R1:B IN 16.8
209 ; CONVERT TO 9.7
210                     MOV             C,ACC.0
211                     MOV             A,R1
212                     RRC             A
213                     MOV             R0,A
214                     MOV             A,B
215                     RRC             A
216                     MOV             R1,A
217
218 ; NOW HAVE E - (LASTE - LASTE*(4/256)) IN 9.7 IN R0:R1
219
220                     MOV             A,S_X_LASTM+1
221                     SUB             A,S_X_LASTM
222                     MOV             B,A
223                     MOV             A,S_X_LASTM
224                     JNB             ACC.7,XFILTER1
225                     SUBB            A,#0FFH                 ;SIGN EXTEND
226                     SJMP            XFILTER2
227
228 XFILTER1            EQU             $
229                     SUBB            A,#0
230
231 XFILTER2            EQU             $
232                     XCH             A,B
233
```

```
234  ; NOW B:A = LASTM*(1-1/256 )
235
236  *
237  ** ADD 9.7 RESULT OF E-C1*LASTE, WHICH IS IN R1:R0
238  *
239                          ADD             A,R1
240                          XCH             A,B
241                          ADDC            A,R0
242  *
243  ** RESULT OF FILTER NOW IN A:B, 9.7 SIGNED
244  *
245                          MOV             S_X_LASTM,A
246                          MOV             S_X_LASTM+1,B
247
248                          JNB             OV,XFILTER3_5
249
250                          MOV             B,#80H              ;FULL NEGATIVE
251                          JNB             ACC.7,XFILTER2_5
252                          MOV             B,#7FH
253
254  XFILTER2_5              EQU             $
255                          MOV             A,B
256
257  XFILTER3_5              EQU             $
258                          MOV             C,ACC.7
259                          MOV             S_TEMPBITF,C        ;SAVE SIGN BIT
260
261                          MOV             C,B.7
262                          RLC             A                   ;MAKE INTO 8 BITS
263
264                          JNB             S_TEMPBITF,XFILTER5
265                          CPL             A
266                          INC             A
267                          SJMP            XFILTER5
268
269  XFILTER4                EQU             $
270                          MOV             C,B.7               ;SAVE SIGN IN TBF
271                          MOV             S_TEMPBITF,C
272                          JNC             XFILTER4_0
273                          CPL             A
274                          INC             A
275
276  XFILTER4_0              EQU             $
277                          XCH             A,B
278                          JZ              XFILTER4_1
279                          CJNE            A,#0FFH,XMAXPWM
280  XFILTER4_1              EQU             $
281                          XCH             A,B
282  XFILTER5                EQU             $
283
284                   MOV             B,S_PSCOMP
285                   MUL             AB
286                   MOV             A,#7FH
287                   SUBB            A,B
288                   JNC             XSERVO8_5
289
290  XMAXPWM         EQU             $
291                   MOV             A,#7FH
292                   DJNZ            S_XSHUTCNT,XCLOSE0
293                   SETB            S_X_AXIS_DOWN
294                   MOV             B,#0
295
296
297  XSERVO8_5       EQU             $
298
299                   MOV             S_XSHUTCNT,S_SHUT_THRESH
300
301                   MOV             A,B
302
```

```
303   XCLOSE0       EQU         $
304                 JB          S_TEMPBITF,XCLOSE
305
306                 CPL         A
307                 INC         A
308
309   XCLOSE        MOV         R0,#S_XPWM
310                 MOVX        @R0,A
311
312   *
313   ** CHECK FOR SHUTDOWN
314   *
315
316   CHKSHUT       EQU         $
319                 JNB         S_X_AXIS_DOWN,IRQGOVEC
320
321                 SETB        S_SHUTDOWN
322                 SETB        S_NSAFE              ;KILL DRIVE TO MOTORS
323
324   SHUTDOWN      EQU         $
325                 CLR         A
326                 MOV         R0,#S_XPWM
327                 MOVX        @R0,A
332
333   IRQGOVEC      EQU         $
334                 MOV         A,S_VECT
335                 MOV         DPTR,#SERVOVECT
336                 JMP         @A+DPTR
337
338   SERVOVECT     EQU         $
339                 LJMP        SIDLE            ;0  = IDLE ROUTINE
340                 LJMP        ACCEL            ;3  = ACCELERATION ROUTINE
341                 LJMP        SLEW             ;6  = SLEW ROUTINE
342                 LJMP        DECEL            ;9  = DECELERATION ROUTINE
343                 LJMP        DO_PD            ;12 = PEN DOWN ROUTINE
344                 LJMP        FPCURSORS        ;15 = CURSORING ROUTINE
345                 LJMP        SAT_MONITOR      ;18 = SATURATION MONITOR
346                 LJMP        FPCURS1          ;21 = MOTOR MOVER STUFF
347                 LJMP        DO_AMP_SET       ;24 = EDGE SENSE
348                 LJMP        DEAD_COMP        ;27 = DEADBAND COMP
349                 LJMP        VECT_DELAY       ;30 = INTER-VECTOR DELAY
350                 LJMP        DO_PU            ;33 = PEN UP ROUTINE
351
352   *
353   ** SERVO IDLE ROUTINE
354   *
355   SIDLEA        EQU         $
356                 MOV         S_VECT,#0
357   *
358   ** PUT ZEROES INTO REF BUF
359   *
360   SIDLE         EQU         $
361                 MOV         R0,S_REF_PNTR
362                 MOV         @R0,#0
363                 INC         R0
364                 MOV         @R0,#0
365
366                 INC         R0
367                 MOV         A,R0
368                 CJNE        A,S_END_REF_BUF,SIDLE11
369                 MOV         A,#S_REF_BUF
370
371   SIDLE11       EQU         $
372                 MOV         S_REF_PNTR,A
373
374                 MOV         DPH,S_TEMP_DPH
375                 MOV         DPL,S_TEMP_DPL
376                 MOV         B,S_TEMP_B
```

| | | |
|---|---|---|
| 377 | MOV | PSW,S_TEMP_PSW |
| 378 | MOV | A,S_TEMP_ACC |
| 379 | RETI | |
| 380 | | |

What is claimed is:

1. In a digital rate compensation servo controller for controlling a plant apparatus and employing a displacement indicator having a predetermined resolution and providing displacement signals indicative of displacement of said plant and which are integral multiples of said resolution, and further employing a rate compensation feedback loop for providing rate compensation signals to be combined with reference control signals, the magnitude of said compensation signals varying as a function of estimates of the plant velocity, said velocity estimates being dependent on said displacement signals, and wherein updated velocity estimates are provided under high velocity conditions at a first relatively high fixed sample rate, the improvement comprising means for modifying the rate at which non-zero velocity estimates are provided under low velocity conditions so that updated non-zero velocity estimates are provided only after said displacement signal has incremented by said predetermined resolution, thereby substantially reducing rate quantization error due to said displacement indicator resolution.

2. The improvement of claim 1 wherein said controlled plant comprises a motor having a motor shaft and means for driving the motor shaft through rotary displacement as a function of motor drive signals, and wherein said displacement indicator comprises a shaft encoder for providing a displacement signal each time said shaft rotates through a predetermined angular displacement, said angular displacement being related to said predetermined resolution.

3. The improvement of claim 2 further comprising first means for determining said velocity estimates under low velocity conditions employing the relationship $X/T_s$, where $X$ represents said encoder resolution and $T_s$ represents the time interval between changes in said displacement signal.

4. The improvement of claim 3 wherein said improvement further comprises second means for further reducing said rate compensation signals as said estimated velocity decreases.

5. The improvement of claim 4 wherein said second means comprises means for reducing the average rate compensate feedback signal by a factor of $1/T_s$.

6. A digital sample rate servo motor controller, comprising:
a servo motor having a motor shaft and means for driving the shaft through rotary displacement as a function of motor drive signals;
a motor driver responsive to motor control signals for providing said motor drive signals;
means for providing servo reference control signals;
means for providing digital displacement signals indicative of the motor shaft displacement, said means having a predetermined resolution and wherein said digital displacement signals indicates displacement of said shaft as a function of integral multiples of said resolution;
position compensation feedback means responsive to said displacement signals for providing digitized position compensation feedback signals in dependence on estimates of total motor shaft displacement;
rate compensation feedback means for providing digitized rate compensation feedback signals in dependence on estimates of the motor shaft displacement rate;
means responsive to said reference control signals, said position compensation feedback signals and said rate compensation feedback signals for providing said motor control signals; and
means for controlling said rate compensation feedback means so that said means operates under high rate conditions to provide updated displacement rate estimates at a first, relatively high fixed sample rate, and under low rate conditions to provide non-zero updated rate estimates at a variable sample rate and only after incremented displacement signals are provided.

7. The controller of claim 6 wherein said means for providing said displacement signals comprises a shaft encoder for providing a displacement signal each time said shaft rotates through a predetermined angular displacement, said angular displacement being related to said predetermined resolution.

8. The controller of claim 7 wherein said rate compensation feedback means comprises means for providing a first rate feedback means, said means comprising means for providing updated displacement rate estimates in dependence on the ratio of said resolution and the measured time interval between changes in said displacement signal, said first means being activated by said controlling means under low rate conditions.

9. A sample rate servo motor controller, comprising:
a servo motor having a motor shaft and means for driving the shaft through rotary displacement as a function of motor drive signals;
a motor driver responsive to motor control signals for providing said motor drive signals;
means for providing servo reference control signals;
means for providing displacement signals indicative of the motor shaft displacement, said means having a predetermined resolution and wherein said displacement signals indicates displacement of said shaft as a function of integral multiples of said resolution, said means comprising a shaft encoder for providing a displacement signal each time said shaft rotates through a predetermined angular displacement, said angular displacement being related to said predetermined resolution;
position compensation feedback means responsive to said displacement signals for providing digitized position compensation feedback signals in dependence on estimates of total motor shaft displacement;
rate compensation feedback means for providing digitized rate compensation feedback signals in dependence on estimates of the motor shaft displacement rate;

means responsive to said reference control signals, said position compensation feedback signals and said rate compensation feedback signals for providing said motor control signals;

means for controlling said rate compensation feedback means so that said means operates under high rate conditions to provide updated displacement rate estimates at a first, relatively high fixed sample rate, and under low rate conditions to provide non-zero updated rate estimates at a variable sample rate and only after incremented displacement signals are provided; and wherein said rate compensation feedback means comprises means for providing a first rate feedback means, said means comprising means for providing updated displacement rate estimates in dependence on the ratio of said resolution and the measured time interval between changes in said displacement signal, said first rate feedback means being activated by said controlling means under low rate conditions, said first rate feedback means further comprises means for attenuating said rate compensation feedback signal, said attenuation being an inverse function of said rate estimates, whereby said attenuation increases as said rate estimates decrease.

10. The controller of claim 9 wherein said attenuating means effectively reduces said rate estimate by a factor of $1/T_s$, when $T_s$ is the time interval between successive changes in said displacement signal.

11. A digital servo motor controller responsive to digital reference control signals, comprising:

a servo motor having a motor shaft and means for driving the shaft through rotary displacement as a function of motor drive signals;

a motor driver responsive to motor control signals for providing said motor drive signals;

means for providing displacement signals indicative of the motor shaft displacement, said means having a predetermined resolution and providing a displacement signal which indicates displacement of said shaft as a function of integral multiples of said resolution;

first feedback means responsive to said displacement signal for providing first digitized feedback signals in dependence on the displacement of the motor shaft;

second feedback means responsive to said displacement signal for providing second digitized feedback signals in dependence on the motor shaft displacement rate;

means for combining said reference control signals and said first and second feedback signals to provide said motor control signals; and means for controlling said second feedback means so that said means operates when said motor shaft displacement rate exceeds a predetermined rate to provide updated second feedback signals at a first, relatively high fixed sample rate, and when said motor shaft displacement rate is less than a predetermined value to provide updated second feedback signals only when updated displacement signals are provided.

12. The controller of claim 11 wherein said means for providing said displacement signals comprises a shaft encoder for providing a displacement signal each time said shaft rotates through a predetermined angular displacement, said angular displacement being related to said predetermined resolution.

13. A dual axis velocity feedback servo controller apparatus for controlling the movement of a first device along a first axis and the movement of a second device along a second axis, comprising:

respective first and second means for providing respective first and second displacement signals indicative of the respective displacement of said first and second devices along said respective axes, each said means having a predetermined resolution value and providing displacement signals which are updated each time said respective device is displaced through said resolution value;

respective first and second velocity feedback compensation means for providing first and second digitized velocity feedback compensation signals in dependence on the respective velocities of said devices along said respective axes;

said velocity feedback means each comprising means responsive to said respective first and second displacement signals for estimating the velocity of said respective device, said means operating under high velocity conditions to provide updated velocity estimates at a first, relatively high sample rate, and under low velocity conditions to provide updated non-zero rate estimates at a variable sample rate and only after a change in said respective displacement signal.

14. The apparatus of claim 13 wherein said first controlled device comprises a first device driven along said first axis by a first motor having a first motor shaft, and said second device comprises a second device driven along said second axis by second motor having a second motor shaft, and wherein said first and second displacement signal means comprises respective first and second shaft encoders for providing a respective position signal each time said respective shaft rotates through a predetermined angular displacement, said displacement being related to said predetermined resolution.

15. The apparatus or claim 14 wherein said respective means for providing velocity estimates under low velocity conditions each comprises first means for determining said velocity estimates in accordance with the relationship $X/T_s$, where X represents said respective encoder resolution and $T_s$ represents the measured time interval between changes in said position signal.

16. The apparatus of claim 15 wherein each velocity feedback loop further comprises second means for further reducing said respective velocity feedback signals as said velocity estimates decrease.

17. The apparatus of claim 16 wherein each said respective second means comprises means for reducing the average velocity feedback signal by a factor of $1/T_s$.

18. The apparatus of claim 14 wherein said apparatus is for controlling an X-Y plotter, wherein said first device comprises a plotter pen drive assembly for positioning the plotter pen along the X axis, and said second device comprises a plotter paper transport for transporting the plotter paper along the Y axis.

* * * * *